US006941364B2

(12) United States Patent
Kim et al.

(10) Patent No.: US 6,941,364 B2
(45) Date of Patent: Sep. 6, 2005

(54) MODULAR-TYPE HOME GATEWAY SYSTEM INCLUDING ADSL CONTROLLER AND HOMEPNA CONTROLLER

(75) Inventors: Jong-Won Kim, Taejon (KR); Kwang-Ro Park, Taejon (KR); Jae-Woo Yang, Taejon (KR)

(73) Assignee: Electronics and Telecommunications Research Institute, Taejon (KR)

(*) Notice: Subject to any disclaimer, the term of this patent is extended or adjusted under 35 U.S.C. 154(b) by 856 days.

(21) Appl. No.: 09/872,287

(22) Filed: May 31, 2001

(65) Prior Publication Data

US 2002/0091861 A1 Jul. 11, 2002

(30) Foreign Application Priority Data

Dec. 27, 2000 (KR) ........................................ 2000-83262

(51) Int. Cl.[7] ........................ G06F 15/173; H04L 12/28; H04L 12/66

(52) U.S. Cl. ........................ 709/223; 709/225; 709/228; 370/254; 370/352; 370/401

(58) Field of Search ................................ 709/223, 225, 709/228, 233, 200, 206, 245; 370/254, 257, 352, 401, 430, 503; 710/310; 379/90.01, 93.28

(56) References Cited

U.S. PATENT DOCUMENTS 5,564,055 A * 10/1996 Asnaashari et al. ............ 713/1
5,812,786 A * 9/1998 Seazholtz et al. ........... 709/233
6,005,861 A 12/1999 Humpleman ................ 370/352
6,212,263 B1 * 4/2001 Sun et al. ................ 379/93.28
6,397,343 B1 * 5/2002 Williams et al. ............ 713/501
6,442,477 B1 * 8/2002 Okada ........................ 701/208
6,453,040 B1 * 9/2002 Burke et al. ........... 379/387.01
6,483,902 B1 * 11/2002 Stewart et al. ........... 379/90.01
6,546,419 B1 * 4/2003 Humpleman et al. ....... 709/223
6,701,406 B1 * 3/2004 Chang et al. ............... 710/310
6,711,138 B1 * 3/2004 Pai et al. .................... 370/257
6,778,549 B1 * 8/2004 Keller ........................ 370/430
6,819,682 B1 * 11/2004 Rabenko et al. ............ 370/503
2001/0036192 A1 * 11/2001 Chiles et al. ............... 370/401
2002/0021465 A1 * 2/2002 Moore et al. ............... 359/125
2002/0026528 A1 * 2/2002 Lo ............................ 709/245
2002/0031226 A1 * 3/2002 Simonsen et al. .......... 380/255

* cited by examiner

*Primary Examiner*—Nabil El-Hady
*Assistant Examiner*—Kenny Lin
(74) *Attorney, Agent, or Firm*—Seed IP Law Group PLLC

(57) ABSTRACT

A modular-type home gateway system that includes a HomePNA controller connectable to an existing home telephone line, for providing a home network interface; an ADSL controller connected to a prior outdoor telephone line for providing an access network interface; and a system controller for controlling the HomePNA controller and the ADSL controller, the HomePNA controller and the ADSL controller formed as a modular type that are detachably connected to the system controller through a predetermined interface, and that provides a bridge function between a home network and an access network. The modular-type home gateway system provides a plurality of informational terminals connected to the home network with various data sharing functions (e.g., Internet service sharing function, a peripheral device sharing function, file/and application program sharing function, and an entertainment service sharing function like a network game) for not only narrow-band service data but also wide-band service data.

6 Claims, 7 Drawing Sheets

MODULAR-TYPE HOME GATEWAY SYSTEM INCLUDING ADSL CONTROLLER AND HOMEPNA CONTROLLER

TECHNICAL FIELD

The present invention relates to a home gateway system installed in the home of a user, which connects a home network to an access network. More particularly, it relates to a modular-type home gateway system which interlocks an access network with a home network by employing ADSL (Asymmetric Digital Subscriber Line) controller for the access network interface and 10 Mbps HomePNA (Home Phoneline Networking Alliance) controller for the home network interface. The home gateway system includes the ADSL controller and the HomePNA controller for controlling various kinds of information terminals connected to the home network, and provides a high-speed home network using a conventional home telephone line by using the HomePNA controller, and allows the ADSL controller to connect the information terminals connected to the home network to the access network by using a conventional outdoor telephone line. The HomePNA controller and the ADSL controller are modular type controllers having PCMCIA (Personal Computer Memory Card International Association) interface. To improve the performance of the HomePNA controller or the ADSL controller, a system controller of a home gateway device is not changed, but either the modular-type HomePNA controller or ADSL controller is replaced, thereby improving the total performance of the home gateway device.

BACKGROUND OF THE INVENTION

The aforementioned modular type Home gateway system provides the ADSL controller with ITU-T G.992.1 (G.dmt) function, and provides the HomePNA controller with 10 Mbps HomePNA 2.0 function.

FIG. 1 is a schematic block diagram of a network structure of a conventional HomePNA gateway system.

Referring to FIG. 1, a network structure using the conventional HomePNA gateway system 10 provides a home network interface unit with 1 Mbps HomePNA interface function, and provides an access network interface unit with 1 Mbps HomePNA interface function. The network structure connects an access network to a home network by using a bridge and a low pass filter (LPF), performs only a short-distance transmission with a maximum access network transmission distance of 300 m, and transmits only a narrow-band service data at a low speed below 1 Mbps.

Further, the conventional low-speed HomePNA gateway system 10 integrates both HomePNA controller and ADSL controller with a system controller as one body. Accordingly, if a user wants to improve a performance of HomePNA controller or ADSL controller, the whole home gateway system should be improved, thereby incurring a user's inconvenience as well as cost ineffectiveness.

SUMMARY OF THE INVENTION

Accordingly, the present invention is directed to a modular-type home gateway system including ADSL controller and HomePNA controller that substantially obviates one or more of the problems due to limitations and disadvantages of the prior art.

It is an object of the present invention to provide a modular-type home gateway system providing a home network interface unit with 10 Mbps HomePNA interface function in order to achieve a high-speed home network using a conventional home telephone line, providing an access network interface unit with 8 Mbps ADSL interface function in order to perform a long-distance transmission of a maximum 5.4 Kilometers (Km) as well as a high-speed wide-band service data transmission by using a conventional outdoor telephone line, providing a bridge function between an access network and a home network, providing a small-sized and economical structure by making HomePNA controller and ADSL controller as a modular type controllers having PCMCIA interface.

It is another object of the present invention to provide a modular-type home gateway system for improving the performance of HomePNA controller or ADSL controller by maintaining the system controller of a home gateway and replacing either a modular-type HomePNA controller or a modular-type ADSL controller, thereby improving the total performance of the home gateway.

It is a still another object of the present invention to provide a modular-type home gateway system for providing a plurality of information terminals connected to a home network with various data sharing functions (e.g., Internet service sharing function, a peripheral device sharing function, file/and application program sharing function, and an entertainment service sharing function like a network game) for not only a narrow-band service data but also a wide-band service data.

To achieve these and other advantages and in accordance with the purpose of the present invention, as embodied and broadly described, a modular-type home gateway system includes:

HomePNA (Home Phoneline Network Alliance) controller connected to a prior home telephone line, for providing a home network interface;

ADSL (Asymmetric Digital Subscriber Line) controller connected to an outdoor telephone line, for providing an access network interface; and a system controller for controlling the HomePNA controller and the ADSL controller, wherein the HomePNA controller and the ADSL controller formed as a modular type are detachably connected to the system controller through a predetermined interface, and provides a bridge function between a home network and an access network.

Additional features and advantages of the invention will be set forth in the description which follows, and in part will be apparent from the description, or may be learned by practice of the invention. The objectives and other advantages of the invention will be realized and attained by the scheme particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The embodiments of the present invention will be explained with reference to the accompanying drawings, in which.

DETAILED DESCRIPTION OF THE INVENTION

Reference will now be made in detail to the preferred embodiments of the present invention, examples of which are illustrated in the accompanying drawings.

A modular-type home gateway system according to the present invention architects a high-speed home network using a conventional home telephone line by using 10 Mbps HomePNA controller. A plurality of information terminals connected to the home network are connected to an access network through 8 Mbps ADSL controller using a conventional outdoor telephone line, thereby making a long-distance transmission of a maximum 5.4 Km. The modular-type home gateway system provides a plurality of information terminals connected to the home network with various data sharing functions (e.g., Internet service sharing function, a peripheral device sharing function, file/and application program sharing function, and an entertainment service sharing function like a network game) for not only a narrow-band service data but also a high-speed wide-band service data. The modular-type home gateway system has a small-sized and economical structure by making the HomePNA controller and the ADSL controller as a modular type controller having a PCMCIA interface. Further, even when improving the performance of HomePNA controller or ADSL controller, the modular-type home gateway system maintains the system controller of the home gateway and replaces either the HomePNA controller or the ADSL controller, thereby improving the whole performance of the home gateway. The ADSL controller and the homePNA are embedded in the modular-type home gateway system.

Figure 1:
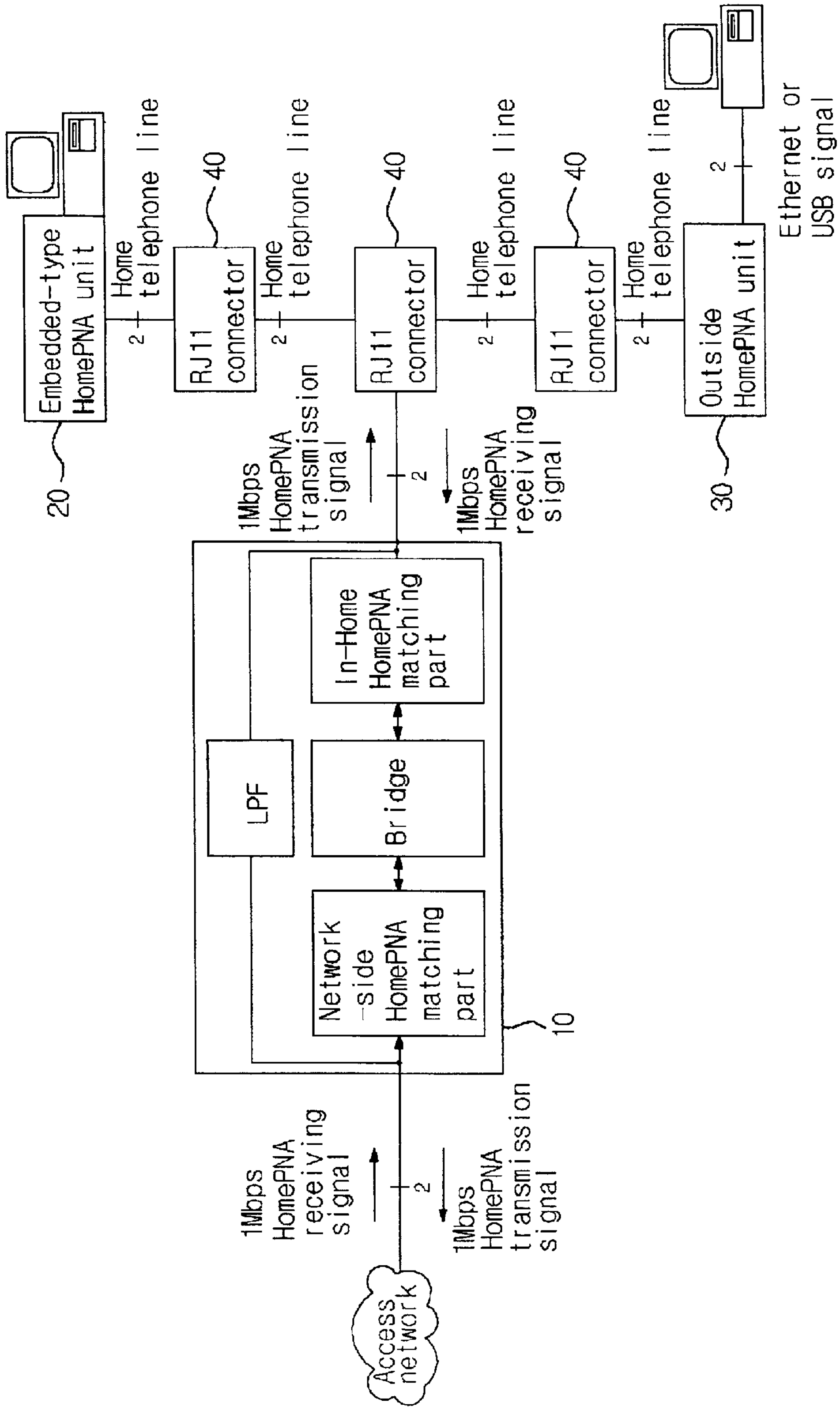
FIG. 1 is a schematic block diagram of a network structure of a conventional low-speed HomePNA gateway system.
Figure 2:
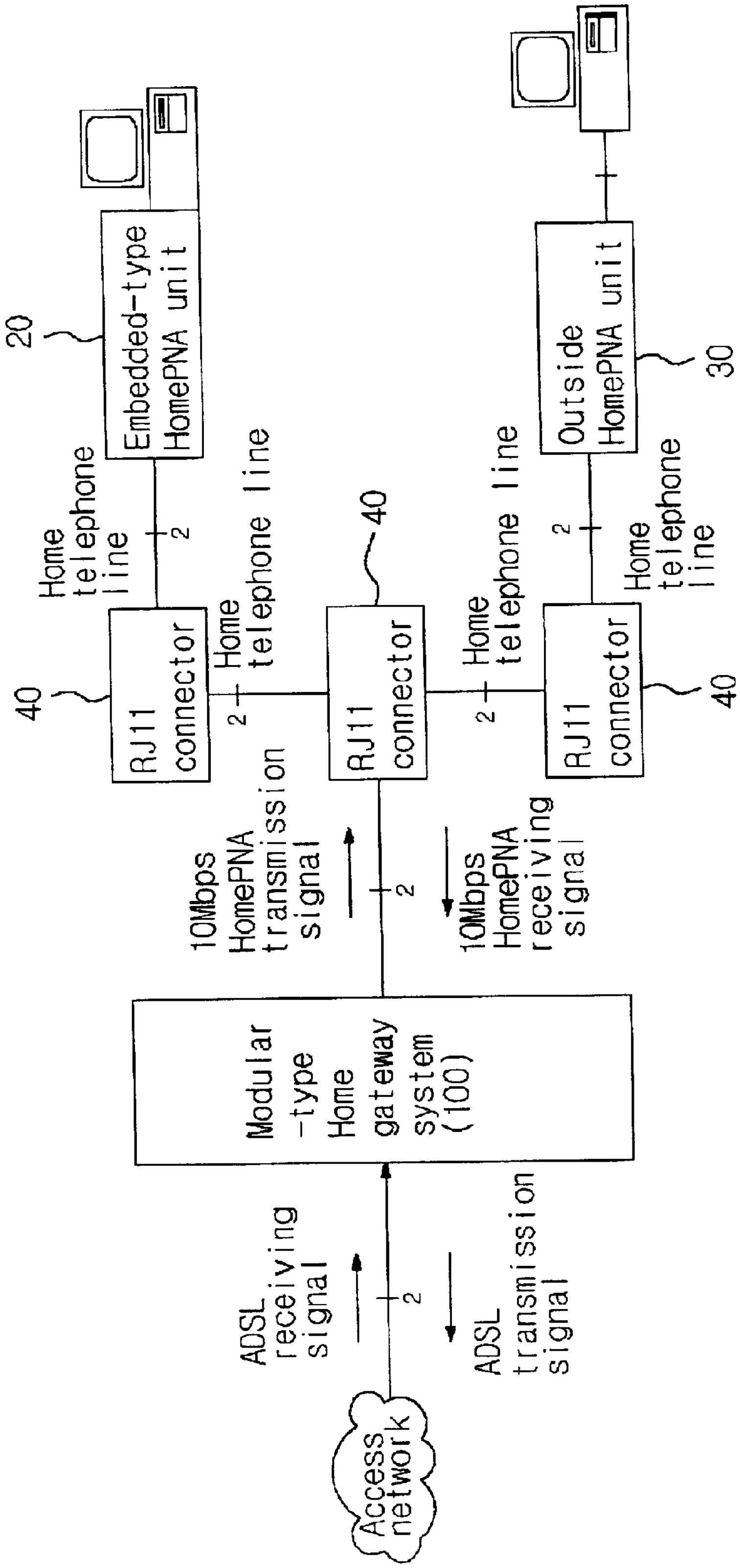
FIG. 2 is a schematic block diagram of a network structure of a modular-type home gateway system according to the present invention.

FIG. 2 is a schematic block diagram of a network structure of a modular-type home gateway system 100 according to the present invention.

As shown in FIG. 2, the modular-type home gateway system 100 is connected to an access network by using 8 Mbps ADSL interface function by using 8 Mbps ADSL interface function as an access network interface unit, and is connected to a home network by using 10 Mbps HomePNA interface function as a home network interface unit. The modular-type home gateway system 100 performs a bridge function between the access network and the home network, and provides various kinds of data sharing functions, such as an Internet service sharing, a peripheral device sharing, a file program sharing, and an application service sharing, by controlling a plurality of information terminals connected to the home network.

RJ11 interface unit 40 is used to interconnect a plurality of home telephone lines.

An embedded HomePNA unit 20 formed as a card shape is embedded within a personal computer (PC), and performs 10 Mbps HomePNA interface function.

An outside HomePNA unit 30 is mounted to the outside of the PC, performs Ethernet or USB (Universal Serial Bus) interface function and 10 Mbps HomePNA interface function, thereby converts Ethernet signal or USB signal of PC to 10 Mbps HomePNA signal or converts 10 Mbps HomePNA signal to Ethernet signal or USB signal of PC.

Figure 3:
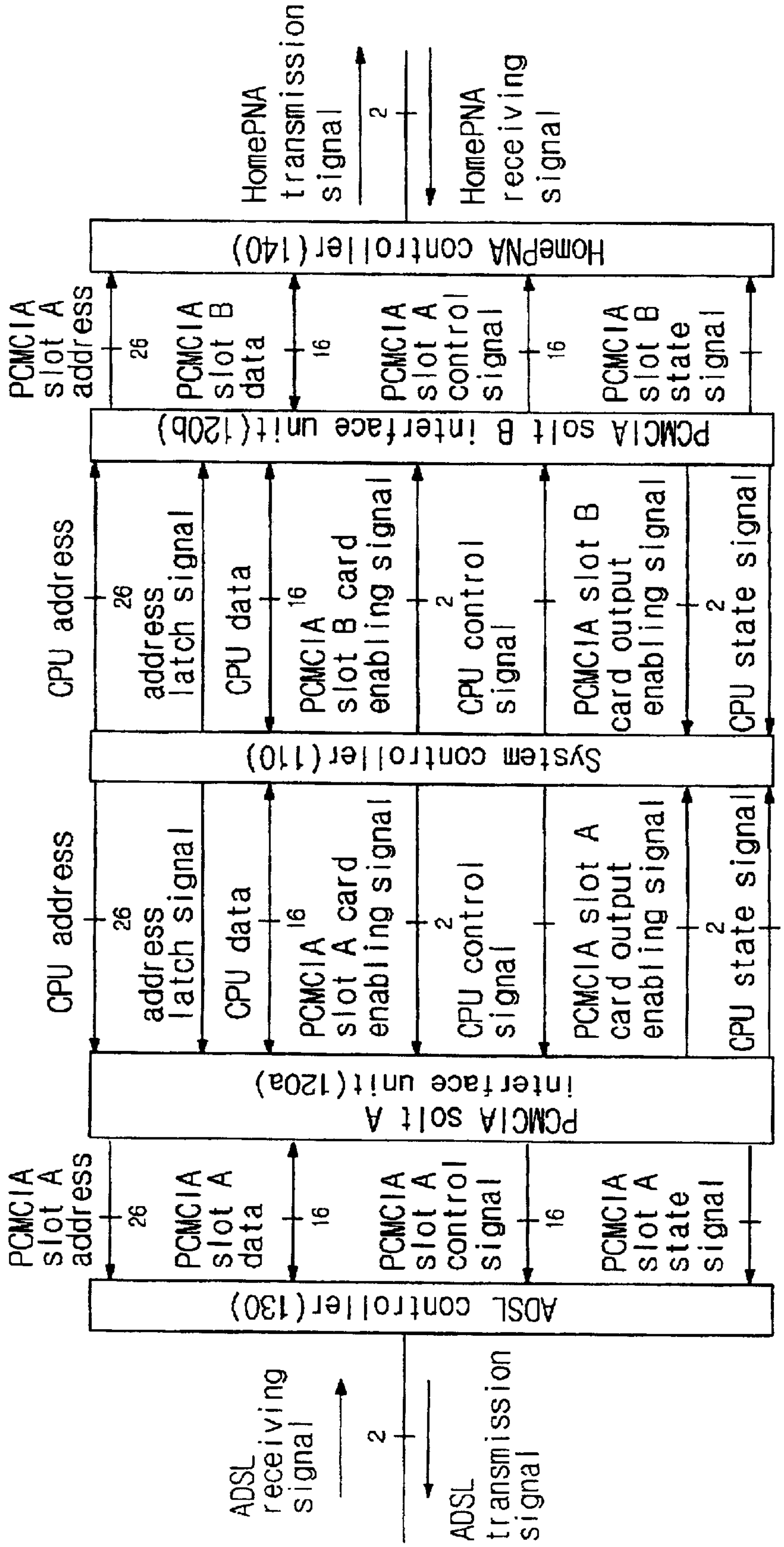
FIG. 3 is a schematic block diagram of a modular-type home gateway system according to the present invention.

FIG. 3 is a detailed block diagram of a modular-type home gateway system 100 according to the present invention.

Operations of the inventive modular-type home gateway system will be described below with reference to FIG. 3.

ADSL controller 130 receives ADSL receiving signal from an access network, and performs ADC (Analog Digital Conversion) function, DMT (Discrete MultiTone) demodulation function, ATM (Asynchronous Transfer Mode) TC (Transmission Convergence) function, SAR (Segmentation And Reassembly) function, and PCMCIA signal conversion function. The ADSL controller 130 transmits PCMCIA slot A data signal of 16 bits and PCMCIA slot A state signal to a PCMCIA slot A interface unit 120*a*, receives a PCMCIA slot A address of 26 bits, a PCMCIA slot A data of 16 bits and a PCMCIA slot A control signal from the PCMCIA slot A interface unit 120*a*, performs SAR function, ATM TC function, DMT modulation function and DAC (Digital Analog Conversion) function, and thereby transmits ADSL transmission signal to the access network.

The PCMCIA slot A interface unit 120*a* converts CPU address of 26 bits to a PCMCIA address of 26 bits when an address latch signal is enabled. When one signal between PCMCIA slot A card enabling signals of 2 bits is enabled, the PCMCIA slot A interface unit 120*a* converts CPU data of 16 bits generated from a system controller 110 to a PCMCIA slot A data of 16 bits and then transmits a PCMCIA slot A data of 16 bits to the ADSL controller 130, or converts a PCMCIA slot A data of 16 bits generated from the ADSL controller 130 to a CPU data of 16 bits and then transmits the CPU data of 16 bits to the system controller 110.

In addition, when a PCMCIA slot A card output enabling signal is enabled, the PCMCIA slot A interface unit 120*a* converts a CPU control signal to a PCMCIA slot A control signal. When all of PCMCIA slot A card enabling signals of 2 bits are enabled, the PCMCIA slot A interface unit 120*a* converts a PCMCIA slot A state signal generated from the ADSL controller 130 to a CPU state signal, and transmits the CPU state signal to the system controller 110.

The system controller 110 programmably controls the ADSL controller 130 through the PCMCIA slot A interface unit 120*a*, and transmits CPU address of 26 bits, an address latch signal, a PCMCIA slot A card enabling signal of 2 bits, a CPU control signal and a PCMCIA slot A card output enabling signal to the PCMCIA slot A interface unit 120*a*. When one signal between PCMCIA slot A card enabling signals of 2 bits is enabled, the system controller 110 receives a CPU data of 16 bits corresponding to a wide-band service data from the ADSL controller 130, stores the CPU data of 16 bits to a synchronous DRAM inside of the system controller 110, converts the stored 16-bits CPU data to a HomePNA data used for a home network, and transmits the HomePNA data to the PCMCIA slot B interface unit 120*b*.

When all of PCMCIA slot A card enabling signals of 2 bits are enabled, the system controller 110 receives CPU state signal from the PCMCIA slot A interface unit 120*a* in order to detect a state of the PCMCIA slot A interface unit 120*a*, programmably controls a HomePNA controller 140 through the PCMCIA slot B interface unit 120*b*, and transmits a CPU address of 26 bits, an address latch signal, a PCMCIA slot B card enabling signal of 2 bits, a CPU control signal, and a PCMCIA slot B card output enabling signal to the PCMCIA slot B interface unit 120*b*.

When one signal between PCMCIA slot B card enabling signals of 2 bits is enabled, the system controller 110 receives a CPU data of 16 bits corresponding to a wide-band service data from the HomePNA controller 140 as an input, and stores the CPU data of 16 bits in a synchronous DRAM inside of the system controller 110. If the stored 16-bits CPU data is to be transmitted to an access network, the system controller 110 converts the stored 16-bits CPU data to an ADSL data used for the access network, and transmits the ADSL data to the PCMCIA slot A interface unit 120*a*. If the stores 16-bits CPU data is to be transmitted to a home network, the system controller 110 converts the stored 16-bits CPU data to a HomePNA data used for the home network, and transmits the HomePNA data to the PCMCIA slot B interface unit 120*b*. When all of PCMCIA slot B card enabling signals of 2 bits are enabled, the system controller 110 receives a CPU state signal from the PCMCIA slot B interface unit 120*b*, and detects a state of the PCMCIA slot B interface unit 120*b*.

The PCMCIA slot B interface unit 120*b* converts a CPU address of 26 bits to a PCMCIA address of 26 bits to a PCMCIA address of 26 bits when an address latch signal is enabled. When one signal between PCMCIA slot B card enabling signals of 2 bits is enabled, the PCMCIA slot B interface unit 120*b* converts CPU data of 16 bits generated from the system controller 110 to a PCMCIA slot B data of 16 bits and then transmits a PCMCIA slot B data of 16 bits to the HomePNA controller 140, or converts a PCMCIA slot B data of 16 bits generated from the HomePNA controller 140 to a CPU data of 16 bits and then transmits the CPU data of 16 bits to the system controller 110.

In addition, when a PCMCIA slot B card output enabling signal is enabled, the PCMCIA slot B interface unit 120*b* converts a CPU control signal to a PCMCIA slot B control signal. When all of PCMCIA slot B card enabling signals of 2 bits are enabled, the PCMCIA slot B interface unit 120*b* converts a PCMCIA slot B state signal generated from the HomePNA controller 140 to a CPU state signal, and transmits the CPU state signal to the system controller 110.

The HomePNA controller 140 receives HomePNA receiving signal from a home network, and performs ADC (Analog Digital Conversion) function, QAM (Quadrature Amplitude Modulation)/FDQAM (Frequency Diverse QAM) demodulation function, IEEE 802.3 CSMA/CD (Carrier Sense Multiple Access with Collision Detection) MAC (Medium Access Control) function, and PCMCIA signal conversion function. The HomePNA controller 140 transmits PCMCIA slot B data signal of 16 bits and PCMCIA slot B state signal to the PCMCIA slot B interface unit 120*b*, receives a PCMCIA slot B address of 26 bits, a PCMCIA slot B data of 16 bits and a PCMCIA slot B control signal from the PCMCIA slot B interface unit 120*b*, performs MAC function, QAM/FDQAM modulation function and DAC (Digital Analog Conversion) function, and thereby transmits a HomePNA transmission signal to the home network.

Figure 4:
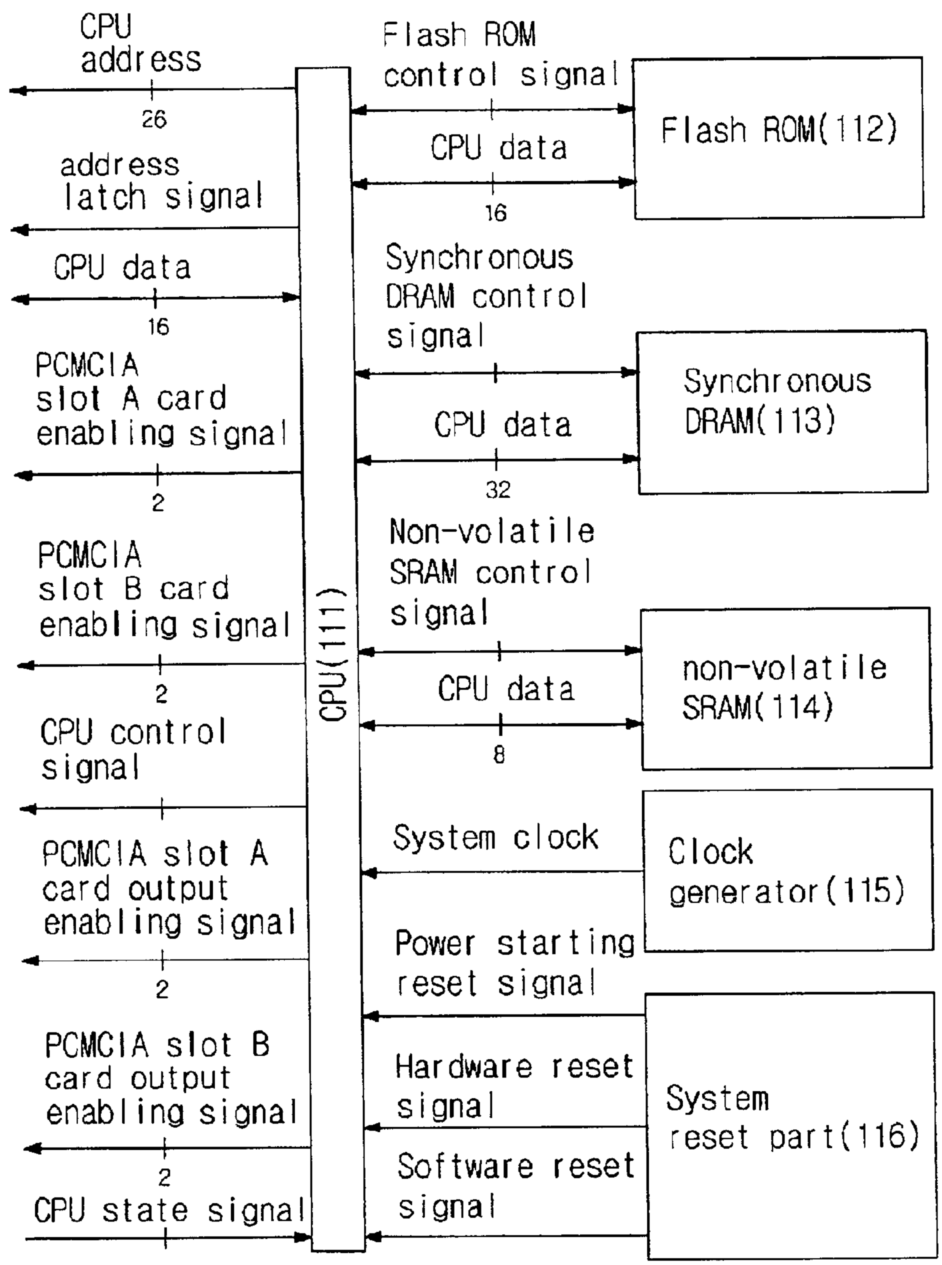
FIG. 4 is a schematic block diagram of a system controller of a modular-type home gateway system of FIG. 3 according to the present invention.

FIG. 4 is a schematic block diagram of a system controller 110 of a modular-type home gateway system of FIG. 3 according to the present invention. Operations of the system controller 100 will now be described in detail with reference to FIG. 4.

CPU 111 performs a program execution function, a calculation function, a memory control function, and a PCMCIA signal generation function, and thereby controls ADSL controller 130, PCMCIA slot A interface unit 120*a*, PCMCIA slot B interface unit 120*b* and HomePNA controller 140. The CPU 111 transmits a wide-band service data of the access network, received from the ADSL controller 130, to the home network via the HomePNA controller 140, and transmits a wide-band service data of the home network, received from the HomePNA controller 140, to the access network via the ADSL controller 130. In brief, the CPU 111 serves as a bridge between the wide-band service data of the access network and the wide-band service data of the home network.

Further, the CPU 111 receives a program from a flash ROM 112 by using a flash ROM control signal and a CPU data of 16 bits, and stores the program in the flash ROM 112. The CPU 111 receives a 16-bits CPU data corresponding to an access network's wide-band service data received from a PCMCIA slot A interface unit 120*a*, and stores the 16-bits CPU data in a synchronous DRAM 113 by using a synchronous DRAM control signal and a CPU data of 32 bits. And, the CPU 111 reads a 32-bits CPU data from the synchronous DRAM 113, and transmits a CPU address of 26 bits, an address latch signal, a CPU data of 16 bits, a PCMCIA slot B card enabling signal of 2 bits, a CPU control signal, and a PCMCIA slot B card output enabling signal to the PCMCIA slot B interface unit 120*b*.

In addition, the CPU 111 receives 16-bits CPU data corresponding to a home network wide-band service data received from the PCMCIA slot B interface unit 120*b*, stores the 16-bis CPU data in the synchronous DRAM 113 by using a synchronous DRAM control signal and a CPU data of 32 bits. Then, the CPU 111 reads the 23-bits CPU data from the synchronous DRAM 113, and transmits a CPU address of 26 bits, an address latch signal, a CPU data of 16 bits, a PCMCIA slot A card enabling signal of 2 bits, a CPU control signal, and a PCMCIA slot A card output enabling signal to the PCMCIA slot A interface unit 120*a*. The CPU 111 receives a profile information of information terminals connected to a home network, from a non-volatile SRAM 114, by using a non-volatile SRAM control signal and a CPU data of 8 bits. The profile information of the information terminals is stored in the non-volatile SRAM 114.

In the meantime, the flash ROM 112 performs a program storage function. In order to make the CPU 111 execute a program, the synchronous DRAM 113 stores a wide-band service data of the access network, a wide-band service data of a plurality of information terminals connected to the home network, and a CPU data. The non-volatile SRAM 114 stores a profile information of the information terminals connected to the home network.

A clock generator 115 generates a system clock, and transmits the system clock to the CPU 111. A system reset part 116 generates a power starting reset signal, a hardware reset signal, and a software reset signal, and transmits them to the CPU 111.

Figure 5:
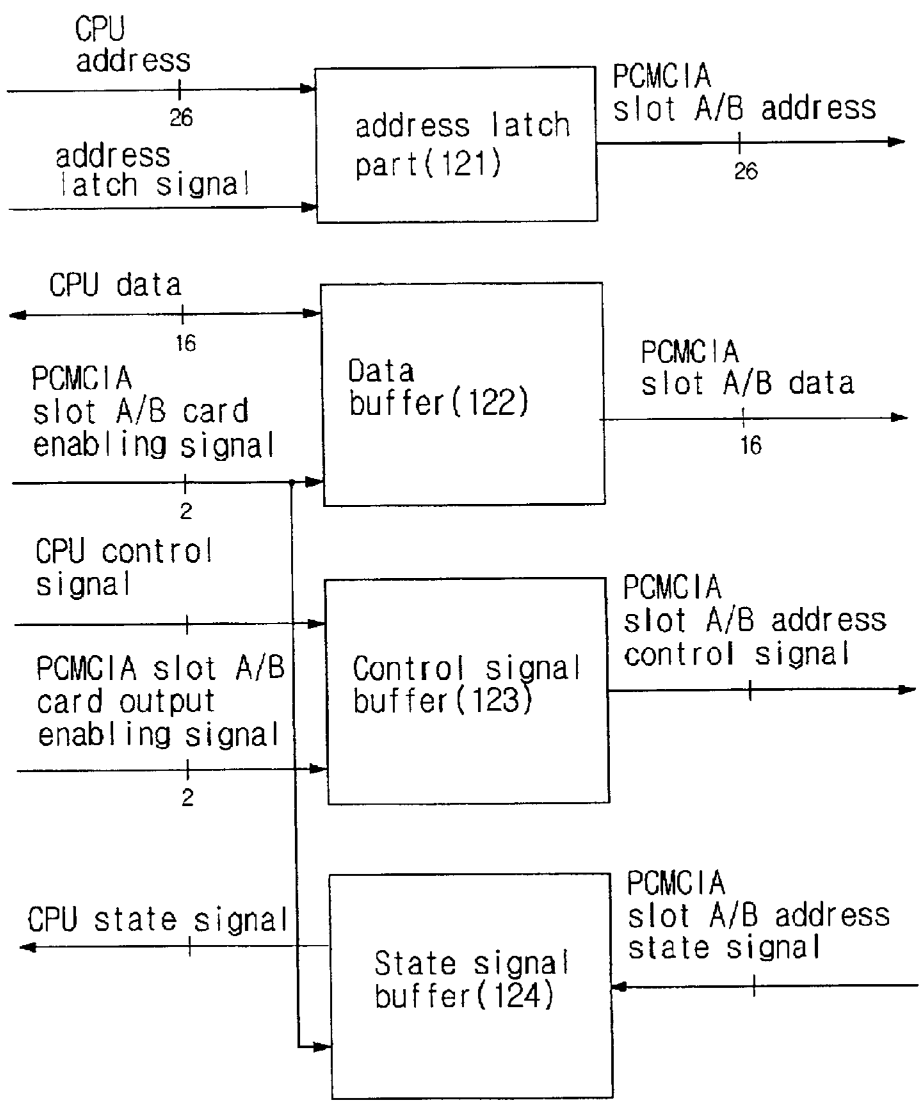
FIG. 5 is a schematic block diagram of a PCMCIA slot A/B interface unit of the modular-type home gateway system of FIG. 3 according to the present invention.

FIG. 5 is a schematic block diagram of a PCMCIA slot A interface unit 120*a* and a PCMCIA slot B interface unit 120*b* (hereinafter referred to as a PCMCIA slot A/B interface unit) of the modular-type home gateway system of FIG. 3 according to the present invention.

An address latch part 121 receives a CPU address of 26 bits and an address latch signal from the system controller 110 of FIG. 3. When the address latch signal is enabled, the address latch part 121 converts a CPU address of 26 bits to a PCMCIA slot A/B address of 26 bits.

A data buffer 122 receives a CPU data of 16 bits and a PCMCIA slot A/B card enabling signal of 2 bits from the system controller 110. When one signal between the PCM- CIA slot A/B card enabling signal of 2 bits is enabled, the data buffer 122 converts the CPU data of 16 bits to a PCMCIA data of 16 bits, or converts a PCMCIA slot A/B data to a CPU data of 16 bits, and transmits a resultant signal to the system controller 110.

A control signal buffer 123 receives a CPU control signal and a PCMCIA slot A/B card output enabling signal from the system controller 110. When the PCMCIA slot A/B card output enabling signal is enabled, the control signal buffer converts the CPU control signal to a PCMCIA slot A/B control signal.

And, a state signal buffer 124 receives a PCMCIA slot A/B state signal. When all of PCMCIA slot A/B card enabling signals generated from the system controller 110 are enabled, the state signal buffer 125 converts the PCMCIA slot A/B state signal to a CPU state signal, and transmits the CPU state signal to the system controller 110.

Figure 6:
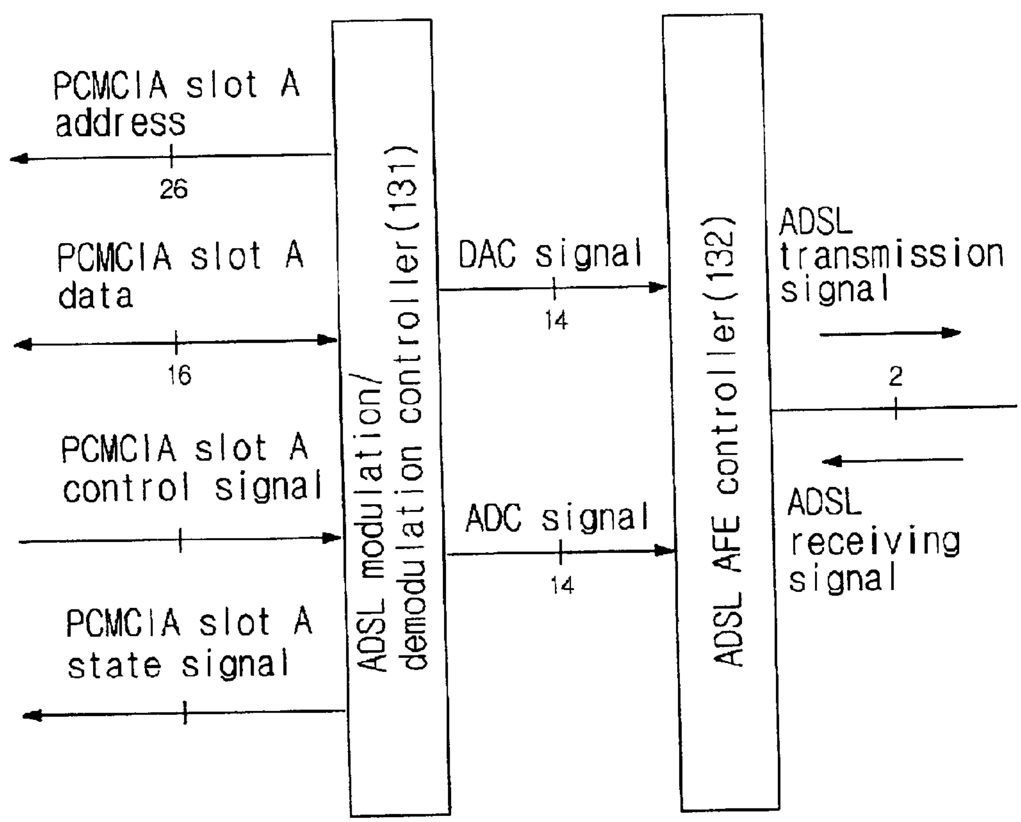
FIG. 6 is a schematic block diagram of ADSL controller of the modular-type home gateway system of FIG. 3 according to the present invention.

FIG. 6 is a schematic block diagram of ADSL controller 130 of the modular-type home gateway system of FIG. 3 according to the present invention.

ADSL modulation/demodulation controller 131 receives a PCMCIA slot A address of 26 bits, a PCMCIA slot A data of 16 bits, and a PCMCIA slot A control signal, from the PCMCIA slot A interface unit 120*a*, performs a SAR function, ATM TC function, and DMT modulation function, and then transmits a DAC signal of 14 bits to ADSL AFE (Analog Front End) controller 132. And, the ADSL modulation/demodulation controller 131 receives the ADC signal of 14 bits from the ADSL AFE controller 132, performs a DMT demodulation function, ATM TC function, and SAR function, and finally transmits both the PCMCIA slot A data of 16 bits and the PCMCIA slot A state signal to the PCMCIA slot A interface unit 120*a* of FIG. 3.

The ADSL AFE controller 132 receives a DAC signal (being a 14-bits digital signal) from the ADSL modulation/demodulation controller 131, and converts the DAC signal to an analog signal. The ADSL AFE controller 132 transmits an ADSL transmission signal to the access network through a two-line outdoor telephone line, receives an analog-type ADSL receiving signal from the access network via the two-line outdoor telephone line, converts the ADSL receiving signal to a digital signal, and thereby transmits an ADC signal of 14 bits to the ADSL modulation/demodulation controller 131.

Figure 7:
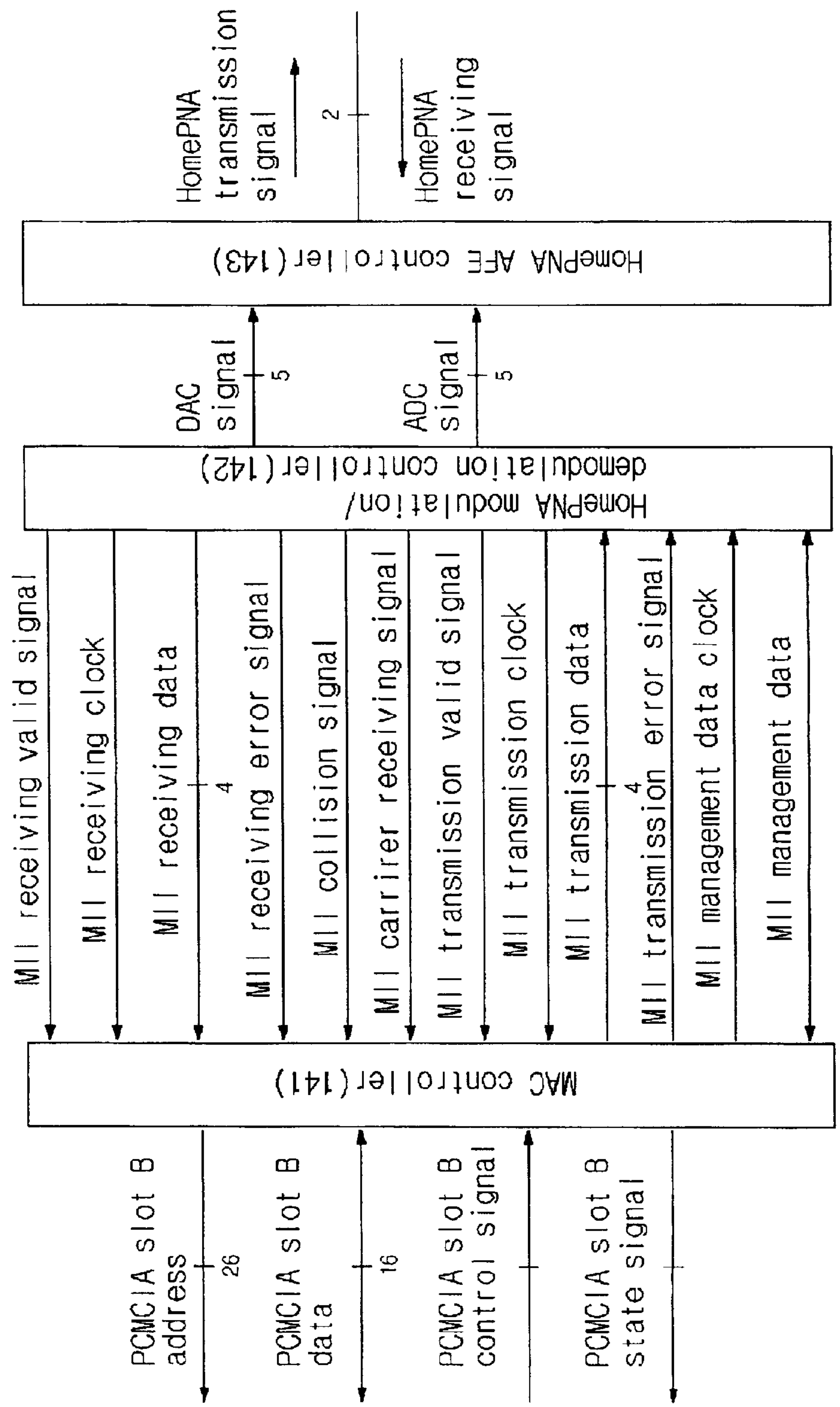
FIG. 7 is a schematic block diagram of HomePNA controller of the modular-type home gateway system of FIG. 3 according to the present invention.

FIG. 7 is a schematic block diagram of HomePNA controller 140 of the modular-type home gateway system of FIG. 3 according to the present invention.

MAC (Medium Access Control) controller 141 receives a PCMCIA slot B address of 26 bits, a PCMCIA slot B data of 16 bits, and a PCMCIA slot B control signal from the PCMCIA slot B interface unit 120*b*, performs IEEE 802.3 CSMA/CD MAC function, and transmits a MII (Media Independent Interface) transmission enabling signal and a MII transmission data of 4 bits synchronized with a MII transmission clock to a HomePNA modulation/demodulation controller 142. If a valid symbol is received from the HomePNA modulation/demodulation controller 142, the MAC controller 141 receives a MII receiving enabling signal and a 4-bits MII receiving data synchronized with a MII receiving clock, performs IEEE 802.3 CSDA/CD MAC function, and transmits a PCMCIA slot B data of 16 bits and a PCMCIA slot B state signal to the PCMCIA slot B interface unit 120*b*. If an invalid symbol is received from the HomePNA modulation/demodulation controller 142, the MAC controller 141 receives a MII receiving error signal, and transmits a PCMCIA slot B state signal to the PCMCIA slot B interface unit 120*b*. When a signal transmitting action and a signal receiving action are performed at the same time so that a signal collision occurs, the MAC controller 141 receives a MII collision signal, and transmits a PCMCIA slot B state signal to the PCMCIA slot B interface unit 120*b*. If a carrier wave is received from the HomePNA modulation/demodulation controller 142, the MAC controller 141 receives a MII carrier receiving signal, and transmits a PCMCIA slot B state signal to the PCMCIA slot B interface unit 120*b*. If a transmission error is generated, the MAC controller 141 transmits a MII transmission error signal to the HomePNA modulation/demodulation controller 142. In case of setting an operation mode of the HomePNA modulation/demodulation controller 142, the MAC controller 141 transmits a MII management data synchronized with a MII management data clock to the HomePNA modulation/demodulation controller 142.

The HomePNA modulation/demodulation controller 142 receives a MII transmission data of 4 bits from the MAC controller 141, performs QAM/FDQAM modulation function, and transmits DAC signal of 5 bits to the HomePNA AFE controller 143. And, the HomePNA modulation/demodulation controller 142 receives an ADC signal of 5 bits from the HomePNA AFE controller 143, performs QAM/FDQAM demodulation function, and transmits MII receiving data of 4 bits to the MAC controller 141.

The HomePNA AFE controller 143 receives a DAC signal (i.e., a digital signal of 5 bits) from the HomePNA modulation/demodulation controller 142, converts the DAC signal to an analog signal, and transmits a HomePNA transmission signal to the home network through a two-line home telephone line. And, the HomePNA AFE controller 143 receives an analog-type HomePNA receiving signal from the home network via the two-line home telephone line, converts the analog-type HomePNA receiving signal to a digital signal, and transmits an ADC signal of 5 bits to the HomePNA modulation/demodulation controller 142.

As described above, a modular-type home gateway system according to the present invention constitutes a high-speed home network using a conventional home telephone line by using 10 Mbps HomePNA controller, interfaces with a high-speed access network using a conventional outdoor telephone line by using 8 Mbps ADSL controller, and provides a bridge function between the access network and the home network. Accordingly, the modular-type home gateway system is applicable to a remote automatic control system using a cellular phone (or a portable terminal) for a homeowner or a subscriber, and is also applicable to a household remote control system for providing the homeowner with a home security service.

In addition, the modular-type home gateway system provides a plurality of information terminals connected to the home network with various data sharing functions (e.g., Internet service sharing function, a peripheral device sharing function, file/and application program sharing function, and an entertainment service sharing function like a network game) for not only a narrow-band service data but also a wide-band service data.

Although representative embodiments of the present invention have been disclosed for illustrative purposes, those who are skilled in the art will appreciate that various modifications, additions and substitutions are possible without departing from the scope and spirit of the present invention as defined in the accompanying claims and the equivalents thereof.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What we claim:

1. A modular-type home gateway system comprising:

a HomePNA(Home Phoneline Network Alliance) controller connected to a prior home telephone line, for providing a home network interface;

an ADSL(Asymmetric Digital Subscriber Line) controller connected to an existing outdoor telephone line, for providing an access network interface; and a system controller for controlling the HomePNA controller and the ADSL controller, wherein the HomePNA controller and the ADSL controller are formed as a modular type that are detachably connected to the system controller through a PCMCIA (Personal Computer Memory Card International Association) interface unit, and that provides a bridge function between a home network and an access network, wherein the PCMCIA interface unit includes:

a PCMCIA slot A interface unit for an interface function between the ADSL controller and the system controller; and a PCMCIA slot B interface unit for an interface function between the HomePNA controller and the system controller:

wherein each of the PCMCIA slot A interface unit and the PCMCIA slot B interface unit includes:

an address latch part for controlling an address signal between the system controller and a PCMCIA slot;

a data buffer for converting PCMCIA slot data to CPU data according to a state of a PCMCIA slot card enabling signal received from the system controller, and for transmitting the PCMCIA slot data to the system controller;

a control signal buffer for converting a CPU control signal to a PCMCIA slot control signal according to a state of the PCMCIA slot card enabling signal received from the system controller; and a state signal buffer for converting a PCMCIA slot state signal to a CPU state signal according to a state of the PCMCIA slot card enabling signal generated from the system controller, and transmitting it to the system controller, wherein the ADSL controller includes:

an ADSL modulation/demodulation controller for processing a data switching between the PCMCIA slot A interface unit and an ADSL AFE (Analog Front End) controller, and for transmitting a resultant signal to the PCMCIA slot A interface unit; and the ADSL AFE controller for interchanging an ADSL transmitting/receiving signal with the access network through an outdoor telephone line after completing the data switching with the ADSL modulation/demodulation controller, and for transmitting the resultant signal to the ADSL modulation/demodulation controller.

2. The modular-type home gateway system according to claim 1, wherein the system controller includes:

a CPU controlling the ADSL controller, the HomePNA controller and a PCMCIA interface unit, and performing a bridge function for achieving a wide-band service data transmission between the ADSL controller and the HomePNA controller;

a flash ROM for storing a program therein;

a synchronous DRAM for storing a plurality of data related to a program execution of the CPU;

a non-volatile SDRAM for storing a profile information of informational terminals connected to the home network;

a clock generator for generating a system clock, and transmitting the system clock to the CPU; and a system reset part for generating an associated reset signal for operating the CPU, and transmitting it the CPU.

3. The modular-type home gateway system according to claim 2, wherein the CPU receives a program from the flash ROM by using a flash ROM control signal and a CPU data, or stores the program in the flash ROM; receives an access network wide-band service data from a PCMCIA slot A interface unit of the PCMCIA interface unit, stores the access network wide-band service data in the synchronous DRAM by using a synchronous DRAM control signal and the CPU data, reads either a signal or data related to a driving of the system controller from the synchronous DRAM, and transmits the related signal or data to a PCMCIA slot B interface unit of the PCMCIA interface unit.

4. The modular-type home gateway system according to claim 3, wherein the CPU receives a home network wide-band service data from the PCMCIA slot B interface unit, stores the home network wide-band service data in the synchronous DRAM by using the synchronous DRAM control signal and the CPU data, reads either the signal or data related to the driving of the system controller from the synchronous DRAM, and transmits the related signal or data to the PCMCIA slot A interface unit.

5. The modular-type home gateway system according to claim 4, wherein the CPU receives a profile information of informational terminals connected to a home network from the non-volatile by using a non-volatile SRAM control signal and the CPU data, and stores the profile information of the informational terminals in the non-volatile SRAM.

6. The modular-type home gateway system according to claim 3, wherein the HomePNA controller includes:

a MAC (Medium Access Control) controller processing a PCMCIA-associated signal or data received from the PCMCIA slot B interface unit according to a predetermined rule, transmitting a resultant signal to a HomePNA modulation demodulation controller, performing a signal processing according to a predetermined control signal received from the HomePNA modulation/demodulation controller, and thereby transmitting the PCMCIA-associated signal or data to either the PCMCIA slot B interface unit or the HomePNA modulation/demodulation controller;

the HomePNA modulation/demodulation controller performing a predetermined data modulation/demodulation function, and transmitting each resultant signal to either a HomePNA AFE(Analog Front End) controller or the MAC controller; and a HomePNA AFE controller converting a digital signal received from the HomePNA modulation/demodulation controller to an analog signal and then transmitting a HomePNA transmission signal to a home network, and converting a HomePNA signal received from the home network to a digital signal and then transmitting the digital signal to the HomePNA modulation/demodulation controller.

* * * * *